(12) United States Patent
Duteil

(10) Patent No.: US 12,324,979 B2
(45) Date of Patent: Jun. 10, 2025

(54) MODULAR INTERACTIVE DIGITAL GAME BOARD

(71) Applicant: MAPSANDMINIS, Issy-les-Moulineaux (FR)

(72) Inventor: Christophe Duteil, Paris (FR)

(73) Assignee: MAPSANDMINIS, Issy-les-Moulineaux (FR)

( * ) Notice: Subject to any disclaimer, the term of this patent is extended or adjusted under 35 U.S.C. 154(b) by 306 days.

(21) Appl. No.: 17/798,194

(22) PCT Filed: Feb. 22, 2021

(86) PCT No.: PCT/EP2021/054336
§ 371 (c)(1),
(2) Date: Aug. 8, 2022

(87) PCT Pub. No.: WO2021/165536
PCT Pub. Date: Aug. 26, 2021

(65) Prior Publication Data
US 2023/0073122 A1 Mar. 9, 2023

(30) Foreign Application Priority Data

Feb. 20, 2020 (FR) .................................... 2001711
Apr. 7, 2020 (FR) .................................... 2003467

(51) Int. Cl.
*G06F 3/0354* (2013.01)
*A63F 13/2145* (2014.01)
*A63F 13/24* (2014.01)
*A63F 13/92* (2014.01)
(Continued)

(52) U.S. Cl.
CPC .......... *A63F 13/2145* (2014.09); *A63F 13/24* (2014.09); *A63F 13/92* (2014.09); *G06F 3/03547* (2013.01); *G06F 3/0383* (2013.01); *G06F 3/165* (2013.01)

(58) Field of Classification Search
CPC ...... A63F 13/2145; A63F 13/24; A63F 13/92; A63F 13/235; A63F 13/323; G06F 3/03547; G06F 3/0383; G06F 3/165; G06F 1/1637; G06F 1/1684; G06F 3/03545;
(Continued)

(56) References Cited

U.S. PATENT DOCUMENTS

2008/0238885 A1* 10/2008 Zachut ................ G06F 3/03545
345/174
2019/0196707 A1* 6/2019 Szeto .................... G06F 1/1626

FOREIGN PATENT DOCUMENTS

WO 2017120676 A1 7/2017

OTHER PUBLICATIONS

Applicant: Mapsandminis; International Application No. PCT/EP2021/054336 Filed Feb. 22, 2021; PCT International International Search Report Apr. 30, 2021; 4 pgs.

* cited by examiner

*Primary Examiner* — Peter J Iannuzzi
(74) *Attorney, Agent, or Firm* — Cognition IP, P.C.; Edward Steakley

(57) ABSTRACT

The present invention relates to a modular interactive digital game board comprising one or more touch pads and one or more movable elements (14) comprising at least one near field communication tag (16), each of the touch pads (1) being configured to interconnect and detect one or more of the movable elements (14), the at least one tag (16) being
(Continued)

configured such that an identifier is transmitted in the presence of an electromagnetic field.

19 Claims, 3 Drawing Sheets

(51) Int. Cl.
*G06F 3/038* (2013.01)
*G06F 3/16* (2006.01)

(58) Field of Classification Search
CPC ...... G06F 3/046; G06F 1/1626; G06F 3/1446; G09G 2300/026; G09G 2356/00
See application file for complete search history.

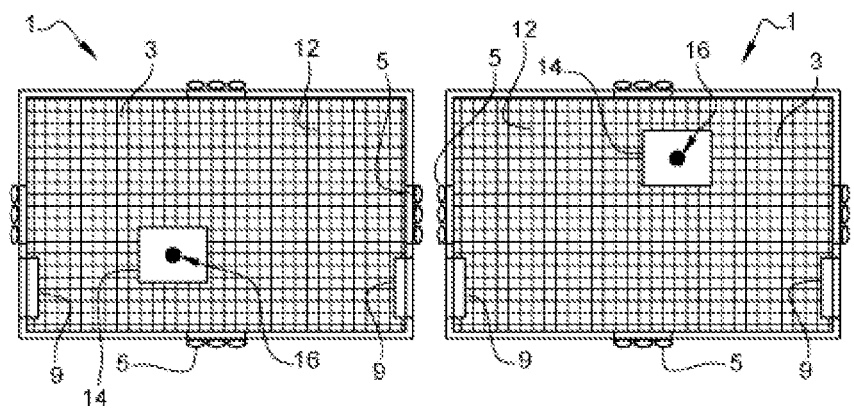
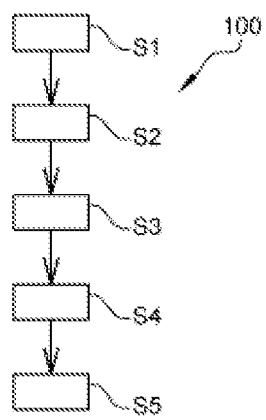

MODULAR INTERACTIVE DIGITAL GAME BOARD

CROSS-REFERENCE TO RELATED APPLICATION

This patent application is a U.S. National Stage Application filed under 35 U.S.C. § 371 OF PCT/EP2021/054336, filed Feb. 22, 2021, and entitled MODULAR INTERACTIVE DIGITAL GAME BOARD, which International Application claims the benefit of priority of French Patent Application No. FR2001711, filed on Feb. 20, 2020 and French Patent Application No. FR2003467, filed Apr. 7, 2020. The entire contents of each of the above-identified patent applications are incorporated herein by reference.

The present invention relates to the field of game boards, in particular hybrid game boards which mix the digital and the physical.

More particularly, said type of board comprises one or more electronic devices comprising a touch-sensitive surface, such as a touch screen, as well as one or more physical elements such as game pieces that are configured to interact with said electronic devices. The touchscreens of said electronic devices thus serve as an interactive game board on which the objects or movable elements are caused to interact, changing the game board, triggering sounds, videos, image changes, etc. Said electronic devices are generally touch pads.

Thus, in numerous situations, it may be necessary to have available a game board, the surface of which is variable; this can be obtained by an assembly of unitary elements, said unitary elements being touch-sensitive surfaces (or pads). Furthermore, it may be necessary to identify and to detect the position of movable objects arranged on the game board, formed of a plurality of touch-sensitive surfaces, such as physical game pieces, interacting with the touch-sensitive surfaces of the pads used as the game board.

It will be noted that a touch pad means any electronic device comprising a touchscreen, said device generally being ultra-flat and substantially providing the same functions as a laptop computer.

The present invention thus proposes a new type of interactive digital game board which allows for improved dynamic management of the media displayed by the various touch pads forming the game board, a modular design and also allowing improved detection and identification of the movable elements, acting as figurines, on the surface of said pads.

The present invention is thus a modular interactive digital game board comprising one or more touch pads and one or more movable elements which comprise at least one tag of the near field communication type, said at least one tag being configured such that an identifier is transmitted in the presence of an electromagnetic field r,
  each of the touch pads comprising:
  a touchscreen which comprises a touch-sensitive surface which is configured to detect the position of at least one movable element comprising at least one conductive surface in a changed electrical state when said element is in contact with said touch-sensitive surface;
  a means for detecting other touch pads, which is configured to detect if another pad is arranged in the vicinity of one of the transverse sides thereof;
  a communication means for communicating with at least one other touch pad detected by said detection means;
  a transmitter of the near field communication type which generates at least one electromagnetic field (said electromagnetic field generated by the transmitter triggering the transmission of an identifier by said tag);
  a receiver which is configured to receive an identifier transmitted by said at least one tag;
  an electronic circuit for managing said detection and communication means which is connected to the touch-sensitive surface and to said receiver, said circuit being configured to associate the position information provided by the touch-sensitive surface with the identifier received by said receiver; said electronic circuit being configured on the one hand to transmit display commands to the touch pads detected and to receive them via said communication means, and on the other hand to associate the position information provided by the touch-sensitive surface with the identifier received by said receiver.

It will be noted that the near field communication technologies comprise in particular the NFC ("Near Field Communication") or RFID ("Radio Frequency Identification") technologies. In the following, the terms "near field communication" will preferably be used for denoting the NFC and RFID technologies, but also the related technologies, i.e. any communication via electromagnetic waves (in particular radio waves) taking place over distances of a few centimeters.

According to a possible feature, the transmission of the electromagnetic field is triggered by the detection of a touch by one of the touch-sensitive surfaces of said pads.

This may be caused by the conductive surface of a tag, by a finger, or any object which can be recognized as a contact point or touch.

According to another possible feature, the conductive surface of said tag is configured such that the electrical state thereof is changed in the presence of a first electromagnetic field, while the transmission of the identifier is triggered by a second electromagnetic field, said electromagnetic fields being transmitted by said transmitter.

According to other possible features:
  the first electromagnetic field is permanent and/or non-modulated, and/or;
  the second field is a modulated electromagnetic field.

According to a possible feature, said tag is passive.

The fact that the tag is passive means that it does not have its own electrical power supply source. More particularly, said tag is configured so as to be supplied with electrical energy by the transmitter, by virtue of the electromagnetic fields transmitted thereby and received by said tag. Said configuration has the advantage of simplifying the design and the manufacture of said tags, as well as reducing the manufacturing costs thereof.

According to another possible feature, said tag comprises a near field receiving antenna, a switch connected to said antenna as well as to said conductive surface, and an electrical ground.

According to another possible feature, said tag is configured such that the switch connects the conductive surface to ground when the antenna receives an appropriate electromagnetic field (for example the second electromagnetic field transmitted by said transmitter).

According to another possible feature, said switch is a transistor.

Said transistor is for example a transistor of the bipolar type or a field-effect transistor.

According to another possible feature, the transmitter is an antenna that surrounds said touch-sensitive surface.

This provision of the antenna (or of the transmitter) makes it possible to generate an electromagnetic field close above said touch-sensitive surface, and thus to optimize the energy required for producing a field of this kind.

According to another possible feature, said at least one movable element comprises at least two conductive surfaces per tag.

Said feature in particular makes it possible for the game board to detect an orientation of the movable element placed on the surface thereof, and to react accordingly (for example to adapt the medium provided by the game board). It is possible, for example, to conceive of a movable element which functions as a door, the image displayed by the screen changing depending on the orientation of said element, the door being closed or open and displaying what is located, or not, behind said door.

According to another possible feature, said at least one movable element comprises at least three conductive surfaces per tag, said conductive surfaces being arranged asymmetrically. This particular arrangement thus makes it possible for the game board to determine an orientation and a direction for the movable element arranged on the surface thereof, thus allowing for new functionalities (change of medium displayed, etc.).

According to another possible feature, the first and second electromagnetic fields are the same electromagnetic field, i.e. there is just one field which triggers the change of the electrical state of the conductive surface and the transmission of the identifier by the tag. Said electromagnetic field is thus not transmitted in a conditional manner, but in an independent manner with respect to the detection of a touch by the touch-sensitive surface. Said field is for example transmitted continuously, or in a cyclical manner. Said field may also initially be non-modulated, and then be modulated, following the detection of a touch on the touch-sensitive surface.

According to another possible feature, said conductive surface of said tag is configured to be in a permanent changed electrical state, said changed electrical state allowing the touch-sensitive surface to detect the position of said one movable element.

According to another possible feature, said display commands comprise one or more of the following items of information:
- at least one spatial display adjustment or shift to be applied to a medium (to be displayed or already displayed), for example according to the Y-axes and/or X-axes of the screens of each of the detected and connected touch pads;
- at least one of the dimensions of the screen of said pad (for example in metric units or in pixels), this being in particular in order to make it possible to calculate adjustments to be applied to an image (for example according to the Y-axes and/or the X-axes, on the Y-axes and the X-axes);
- the location and/or identification of one or more movable elements comprising at least one tag arranged on the touch-sensitive surface of one of said pads.

According to another possible feature, the medium or media displayed by the touchscreens of said pads is/are dependent on the position of one or more movable elements on at least one of said pads.

According to another possible feature, the spatial adjustment or shift to be applied is different depending on said connector via which the information is propagated to an adjacent pad. The adjustment propagated may for example be dependent on one or more of the dimensions of one or more touchscreens of pads.

According to another possible feature, said detection means are one or more connectors.

According to another possible feature, said at least one detection and communication means are combined.

That is to say that the pad comprises one or more means or elements that are configured to detect and communicate with one or more touch pads arranged in the vicinity of one of the transverse edges of said touch pad. It will be noted that the terms "communication" or "connection" are used interchangeably to indicate that the pads are arranged adjacently, and are able to exchange information with the aim of displaying a medium in a coherent manner on the screens of said pads.

According to another possible feature, each of said pads comprises one or more loudspeakers, each of said pads being configured to perform at least one or more of the following actions:
- deactivating the loudspeakers located on the sides close to or in contact with another pad;
- changing the sound depending on the location of a movable element on the touch-sensitive surface of one of said pads.

According to another possible feature, each of the pads comprises a memory configured to store one or more of the following items of information;
- the list of the active communication and/or detection means;
- the presence of a command for displaying a medium;
- the communication means having propagated display commands;
- at least one medium;
- the location and/or the identifier of one or more movable elements comprising at least one tag on the touch-sensitive surface of one of said pads.

According to another possible feature, one or more pads electrically supply, via said communication means, the adjacent pads connected thereto.

This thus makes it possible not to have to recharge all the pads before using the game board according to the invention; indeed, one single pad that is charged or connected to the sector is sufficient for suppling the other pads of said board.

According to another possible feature, each of said pads comprises an accelerometer which is configured to influence the display command(s) sent.

Said accelerometer makes it possible in particular to detect the movement of a pad when this displays an image in association with other touch pads, and to dynamically change the display of the moved pad, and optionally of other pads.

Thus, the present invention also relates to a subassembly of the game board according to the invention, a system for identifying and locating, on a touch-sensitive surface, at least one movable element comprising at least one tag of the near field communication type, said system comprising:
- a transmitter of the near field communication type which generates at least one electromagnetic field;
- at least one movable element comprising at least one tag that uses a near field communication technology, said at least one tag which on the one hand comprises a conductive surface configured such that the electrical state thereof is changed in the presence of a first electromagnetic field, and on the other hand is configured such that an identifier is transmitted in the presence of a second electromagnetic field, said electromagnetic fields being generated by said transmitter;

a touchscreen configured to detect the position of at least one movable element comprising at least one conductive surface in a changed electrical state when said element, in particular the conductive surface thereof, is in contact with said touch-sensitive surface;

a receiver which is configured to receive the identifier transmitted by said at least one tag;

an electronic circuit which is connected to the touch-sensitive surface and to said receiver, said module being configured to associate the position information provided by the touch-sensitive surface with the identifier received by said receiver.

The invention also relates to a method for identifying and locating, on a touch-sensitive surface, at least one movable element comprising at least one tag of the near field communication type, said tag comprising a conductive surface configured such that the electrical state thereof is changed in the presence of an electromagnetic field and, furthermore, so as to transmit an identifier in the presence of an electromagnetic field, said method comprising the following steps:

transmitting a first electromagnetic field, for example of the near field communication type, in the vicinity of the touch-sensitive surface;

changing the electrical state of the conductive surface of the tag, following the reception of said first electromagnetic field;

detecting, by the touch-sensitive surface, of the position of the movable element, via the conductive surface, the electrical state of which is changed, in particular if the movable element, for example via the conductive surface thereof, is arranged on the touch-sensitive surface;

transmitting an identifier by the tag of said movable element;

receiving the identifier transmitted by the tag of said movable element following the reception of a second electromagnetic field by said tag;

associating the identifier and the position of said element, so as to make it possible to locate an identified element on said touch-sensitive surface.

The invention also relates to a tag of the near field communication type, characterized in that it comprises an antenna, a conductive surface, and an electronic chip that is connected to the antenna and to said conductive surface, said chip being configured to change the electrical state of the conductive surface if the antenna receives an appropriate electromagnetic field.

The change in the electrical state of the conductive surface may for example be a grounding of the conductive surface, the sending of drawing of current or voltage, or the fact of transferring electrical energy from a third device via said conductive surface.

According to a possible feature, the appropriate electromagnetic field is a signal containing a command that can be interpreted by said chip connected to said antenna.

According to another possible feature, said chip is configured to transmit a signal containing an identifier, via the antenna of said tag, for example following the reception of a signal containing a command that can be interpreted by said chip.

According to another possible feature, said conductive surface of said tag is a connector, for example electrical, such as a POGO connector.

The fact that the conductive surface of the tag is a connector makes it possible, for example, to electrically supply a connected third device via said connector, but also to control said supply by managing the electromagnetic field to which the tag is exposed. It is also possible to configure the tag such that a change of state of the connector triggers a change of state or function of the connected third device.

The present invention also relates to another subassembly of the game board, a touch pad comprising at least one touchscreen, characterized in that it comprises;

at least one means for detecting other touch pads, which is configured to detect if at least one pad is arranged in the vicinity of one of the transverse sides thereof, said side being for example identified;

at least one communication means for communicating with at least one other touch pad detected by said detection means;

an electronic circuit for managing said detection and communication means; said electronic circuit being configured to transmit display commands to the touch pads detected and to receive them via said communication means.

According to anther possible feature, said detection means are arranged on the four transverse sides of said touch pad.

According to another possible feature, said pad comprises two opposing main faces and four transverse sides interconnecting said main faces.

According to another possible feature, said touchscreen of said pad is arranged on one of the main faces of the pad.

According to another possible feature, said pad comprises an electric battery, for example in order to autonomously supply said touchscreen.

According to another possible feature, said electronic circuit is configured to determine and/or establish a list, for example periodically or upon a trigger event, of said active communication and/or detection means, such as a list of the active connectors ("active" means a connector that is connected to another pad, via which commands can travel).

This makes it possible in particular to create a list of the means by which the display commands have been propagated, and thus to calculate the adjustments to be applied to the medium to be displayed (or already displayed) by the screens of the different pads. Thus, a history is created of the connectors used for propagating commands and managing said commands by means of the electronic circuit, as a result.

According to another possible feature, said touch pad comprises a memory configured to store one or more of the following items of information:

the list of the active communication and/or detection means (such as a list of the active connectors of the pad);

the presence of a command for displaying a medium;

the communication means having propagated display commands;

at least one medium, such as an image, a video, etc.

According to another possible feature, said pad comprises a means for selecting one or more media to display on the screen of at least one pad. Said selection means makes it possible to define the medium to be displayed by the screen(s) of the pads. Said selection means may thus be a menu which allows the user to select a medium from a list, a medium automatically loaded upon launching an application or upon loading of a game level in the application. Said media selection means may also relate to the change of the display of an existing medium, such as, for example, an adjustment of the display (for example according to one or two axes generated by a user command, such as sliding of a image by means of the touchscreen of the pad).

According to another possible feature, said pad comprises one or more loudspeakers. The loudspeakers are generally arranged on one or more transverse sides (or edges) of the pad. It will be noted that it is advantageous for the electronic circuit to be configured so as to deactivate the loudspeakers located on the sides close to or in contact with another pad, and thus obstructed.

According to another possible feature, said pad comprises mechanical and/or magnetic nesting means in order to allow for other pads to nest in the region of the transverse sides thereof.

Said nesting means allow for optimal positioning among the pads, in order that the pads should be capable of detecting one another and of communicating with one another, but also allowing the creation of a display region that is as homogeneous as possible.

According to another possible feature, each of said connectors is connected to a draw resistor (or "pull-up" resistor), thus making it possible to detect whether or not there is a connection on the connector (and thus to verify that the connector is active).

According to another possible feature, each of said connectors is identified within the pad, thus making it possible to know on which of said connectors an active connection takes place, and/or by which of said connectors a display command is received or sent (and thus to know which side of the pad is connected to another pad).

According to another possible feature, said pad comprises an additional communication means, for example a wireless communication means, such as Wi-Fi, Bluetooth, etc.

It will be noted that said additional communication means and the connectors described above can work together for detection and transmission of display commands among different pads.

The present invention also relates to a method for dynamic display of a medium for a plurality of touch pads, said method comprising at least the following steps, said steps being performed by the pads:
  detecting at least one adjacent touch pad;
  communicating with at least one adjacent touch pad;
  determining at least one side to which a pad is adjacent;
  sending and/or receiving one or more display commands to and/or by said at least one adjacent pad;
  adjusting and displaying the medium on at least two touch pads, depending on the various display commands sent and/or received.

According to another possible feature, active connections are determined and stored. Said electronic circuit of said pad may, for example, construct the list of active connections, i.e. the list of connectors connected to another touch pad.

According to another possible feature, said method comprises a step of selecting a medium to display.

The invention will be better understood, and other aims, details, features and advantages thereof will become clearer, from reading the following description of particular embodiments of the invention, given merely by way of illustrative and non-limiting example and with reference to the accompanying drawings, in which:

FIG. 4 shows a game board according to the invention;

FIG. 5 is a flow diagram of the method for dynamic display of a medium when at least two touch pads of the game board are connected to one another;

The modular interactive digital game board thus comprises one or more touch pads 1 and one or more movable elements 14 which comprise at least one tag 16 of the near field communication type.

Figure 1:
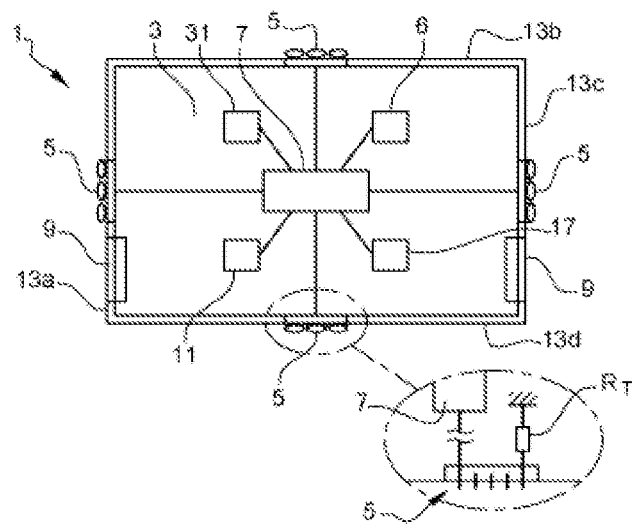
FIG. 1 is highly schematic view of a touch pad of the game board according to the invention.

FIG. 1 is highly schematic view of one of said touch pads 1 of the game board according to the invention.

Figure 2:
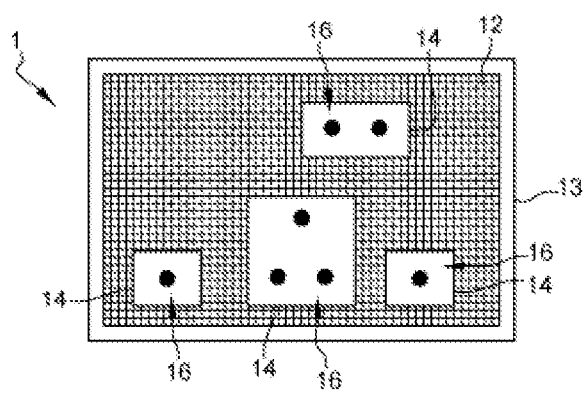
FIG. 2 is highly schematic view of a touch pad of FIG. 1, and movable elements.

Each of the touch pads 1 thus comprises:
  a touchscreen 3 which comprises a touch-sensitive surface 12 (said touch-sensitive surface may be resistive or capacitive; this is illustrated more particularly in FIG. 2) which forms all or part of the game board, said touch-sensitive surface 12 being configured to detect the position of at least one movable element comprising at least one conductive surface in a changed electrical state when said movable element is in contact with said touch-sensitive surface 12;
  a means for detecting 5 other touch pads, which is configured to detect if another pad is arranged in the vicinity, in particular of one of the transverse sides of said pad;
  a communication means 6 for communicating with at least one other touch pad detected by said detection means;
  loudspeakers 9;
  a memory 11 configured to store data.

Said pad 1 also comprises the following elements:
  a transmitter 31 of the near field communication type which generates at least one electromagnetic field, said at least one generated field has for example a frequency of between 10 and 16 MHz (and complies with the standards, in particular the standards ISO/CEI 14443, ISO/IEC 18000-3 and/or ISO.CEI 15693);
  a receiver 17 which is configured to retrieve an identifier transmitted by a transmitter of the near field communication type, such as one of said tags 16;
  an electronic circuit 7 which is configured on the one hand to transmit display commands to the touch pads 1 detected and to receive them via said communication means 6, and on the other hand to associate the position information provided by the touch-sensitive surface 12 with the identifier received by said receiver 17.

It will be noted, furthermore, that said pad 1 further comprises two opposing main faces and four transverse sides 13*a* to 13*d* connecting said main faces, said screen 3 being arranged on one of the main faces.

In the embodiment described here, the detection 5 and communication 6 means are combined, and are connectors 5 which are arranged, respectively, on each of the transverse sides of said touch pad 1. However, the communication means 6 may be an additional communication means, such as a wireless communication module (a Wi-Fi module, Bluetooth module, etc.), which is configured to communication with other electronic devices such as a pad according to the invention.

More particularly, said connectors 5 may be physical connectors of the POGO type, supporting an I2C communication protocol, or indeed near field communication chips of the NFC or RFID type. These connectors thus allow for the detection and transfer of information between the other connected touch pads, via said communication means (and also detection means).

Said electronic circuit 7 is also configured to:
  deactivate the loudspeakers 9 located on a transverse side 13*a-d*, in the region of which another touch pad is detected;

change the sound depending on the location of a movable element 14 on the touch-sensitive surface 12 of one of said pads 1.

Said pad 1 also comprises an electric battery (not shown, for example a lithium ion battery) for autonomously supplying all the elements of the pad that require an electricity supply.

It will also be noted that said pad comprises a selection means which makes it possible to define the medium to be displayed on the screen 3 of the pad 1.

FIG. 1 also includes an enlarged schematic view of a connector 5, more particularly each of said connectors 5 is connected to a draw resistor RT (or "pull-up" resistor), thus allowing the detection of a connection on the connector, Said draw resistor RT is itself connected to ground.

Said transmitter 31, in turn, comprises for example an antenna which may be included in the touch pad 1 or arranged in a separate module. Moreover, in a variant that is not shown, said near field communication transmitter 31 surrounds said touch-sensitive surface 12 (shown more particularly in FIG. 2).

The modular interactive digital game board further comprises one or more movable elements 14 (shown more particularly in FIG. 2), such as a game piece or a figurine, comprising one or more tags 16 which use a near field communication technology.

Figure 3:
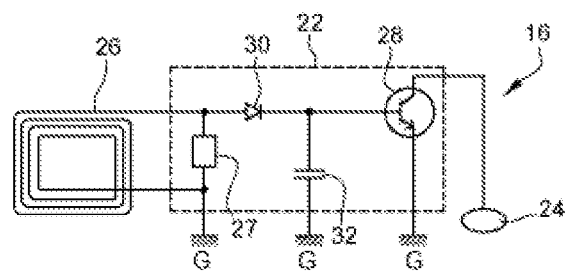
FIG. 3 is highly schematic view of the various functional elements of a tag of a movable element of the game board according to the invention.

As shown in FIG. 3, the tag 16 of said movable element 14 comprises:
- a communications module 22 of the near field communication type;
- at least one conductive surface 24 which is configured such that the electrical state thereof is changed, such as being grounded, in the presence of an electromagnetic field, and so as to interact with the touch-sensitive surface 12;
- an antenna 26 which makes it possible in particular to transmit and/or to receive electromagnetic signals, for example of the near field communication type;

Said tag 16 may also comprise an electronic chip 27 which comprises a storage memory in which the identifier of said tag 16 is stored, said chip 27 is also configured to interpret the messages received via the antenna 26, and to compose response messages transmitted via said antenna 26 (message containing for example said identifier). Indeed, the transmission of a message containing an identifier is generally performed following a particular command, i.e. the transmitter 31 transmits a signal that can be decoded by a tag element such as the dedicated chip 27 (said chip storing an identifier and being configured so as to code the response message comprising the identifier in the transmitted signal).

More particularly, said communications module 22 comprises a switch 28 that is connected to said antenna 26, to said conductive surface 24, and to an electrical ground G.

Said tag 16 is preferably a passive component, i.e. it does not comprise a power source (it is thus not autonomous in terms of energy), but is supplied electrically from the outside, in this case by virtue of the energy received via the antenna 26.

Indeed, when the antenna 26 receives electromagnetic fields generated by the transmitter 31 of the pad 1, a portion of the energy received makes it possible to transmit a message comprising an identifier unique to the tag (more particularly to the chip 27 which is itself unique to said tag 16), while the other portion of the energy received makes it possible, via the switch 28, to connect the conductive surface 24 to the electrical ground G.

It will be noted that the switch 28 is for example a transistor, either bipolar or field-effect, the transmitter of which is connected to ground G, the collector of which is connected to the conductive surface 24, and the base of which is connected to the antenna 26.

Said communications module 22 can also comprise a diode 30 that is located between the transistor base 28 and the antenna 26, and/or a capacitor 32 that is arranged on the branch connecting a point between the diode 30 and the transistor base 28 to ground G. The diode 30 in particular makes it possible to force the direction of the current of the antenna 26 towards the transistor base 28. The capacitor 32, in turn, makes it possible to rectify the voltage at the input of the transistor base 28 (the example above is based on a bipolar transistor, but can also apply in the case of a field-effect transistor).

It will be noted that the conductive surface 24 is for example metal, and sufficiently large to be detectable by the touch-sensitive surface 12 (in general a surface comparable to that of the end of a human finger, i.e. approximately 1 $cm^2$, such that it can be detected by said touch-sensitive surface as a touch).

Thus, when the switch 28 is open, the conductive surface 24 exhibits a high impedance value, but, when the switch is closed, the conductive surface 24 is connected to ground G and is therefore at the potential of ground (there is therefore a change in the electrical state of said conductive surface).

Thus, when a movable element 14 comprising a tag 16 is positioned on the touch-sensitive surface 12, the presence of the electromagnetic field generated by the transmitter 3 causes the conductive surface 24 to be grounded and a touch to be detected, via said grounded conductive surface 24, in the region of the touch-sensitive surface 12.

An identifier, generally unique, is also transmitted by said tag 16. The transmission of the signal containing the identifier is for example triggered by the electromagnetic field transmitted by the transmitter 3 having brought about the grounding of the conductive surface 24.

In one variant, the electromagnetic field transmitted by the transmitter 31 sees its state changed (for example said field becomes modulated) following the detection of a touch by said touch-sensitive surface 12, the transmission of the identifier by the tag 16 being triggered on condition of receiving an appropriately modulated electromagnetic field.

In another preferred variant, the transmitter 31 is configured to transmit separate first and second electromagnetic fields, the first electromagnetic field triggering the change of electrical state of the conductive surface 24 of a tag 16, while the second electromagnetic field triggers the transmission of the identifier of the tag 16 of the element 14.

The transmission of the second electromagnetic field is for example triggered (in particular by the electronic module 18) on condition that the touch-sensitive surface 12 detects a touch.

In another variant that is not shown, the conductive surface 24 of the tag 16 is configured to be in a permanent changed electrical state, said changed electrical state allowing the touch-sensitive surface 12 to detect the position of said one movable element 14 without being conditioned by an electromagnetic field. The permanent electrical state can be obtained by a power source that is included in the tag 16, and/or by inductive supply (or recharge) mechanisms.

Thus, whatever the variant, the circuit 7 receives on the one hand, via the receiver 17, the signal comprising the identifier transmitted by the tag 16 and, on the other hand, via the touch-sensitive surface 12, the location of the zone where a touch has occurred.

It will be noted that the circuit 7 can be connected to the touch-sensitive surface 12 directly, or indirectly, via a third element such as the receiver 17 or the transmitter 31.

The electronic circuit 7, connected to the touch-sensitive surface 12 and to the receiver 17, thus associates the position of the contact detected in the region of the touch-sensitive surface 12 to the identifier received by the receiver 17. The circuit 7 is thus configured to identify and locate the position of a movable element 14 comprising a tag 16 arranged on a touch-sensitive surface 12.

Furthermore, said circuit 7 comprises a memory 11 that makes it possible to store information, such as the identifiers received, the position coordinates (location) of the movable elements, and their association.

FIG. 4, in turn, is a highly schematic view of two pads 1 of the game board which are interconnected via one of the connectors 5 thereof.

Thus, when two pads 1 are brought appropriately and sufficiently close together (reference is also made to the pads being assembled), connectors 5 of each of the respective pads 1 are then connected to one another.

Subsequently, each of the pads 1 carries out a method 100 of dynamic display of a medium for touch pads, as shown in FIG. 5:

detecting S1 the adjacent pad 1, in particular via the connectors 5 thereof and the respective electronic circuit 7 thereof;
  communicating S2 with the adjacent pad 1, in particular via the connectors 5;
  determining S3 the side to which the pad 1 is adjacent, in particular by the fact that each of the connectors 5 is identified and located on each of the pads 1;
  sending a display command to the adjacent pad 1 detected, and/or receiving S4 one or more display commands from the adjacent pad;
  adjusting and displaying S5 the medium on two adjacent touch pads 1, depending on the various display commands sent and/or received.

It will thus be noted that the method described above with reference to FIG. 5 can be generalized to a large number of interconnected pads (i.e. the pads that are detected and communicate, for example step-by-step, with one another).

The display commands propagate from pad to pad, in order to allow for the display of the desired medium, whatever the number and the arrangement of touch pads.

Each of the pads 1 also comprises a selection means as described above, but, in order to prevent medium display conflicts, among the pads, one of the pads may be defined as a "reference" pad, and the medium selected on the reference pad thus takes precedence over the media displayed or to be displayed that originate from other pads. The status of reference pad can be triggered for example by selecting a medium on said pad.

Said method may also comprise one or more of the following steps:

determining active connectors and storing these; said determination of the active connectors may for example be launched periodically, in order to update the active connections; said step is performed for example via the electronic circuit and the memory of the pad,
  storing connectors via which a display command has been received; said specific storage makes it possible to avoid the received display command being propagated by the connector by which said command has been received,
  deactivating at least one loudspeaker of the pad depending on the active connectors; indeed, each pad having information relating to a connection with another pad on a connector located on the same side as the loudspeaker makes it possible for the electronic circuit of the pad to determine the obstructed loudspeakers and to deactivate them. Thus, in this configuration, only the unobstructed loudspeakers provide a sound signal. It is also possible to propagate the reference of the sound medium to be displayed by the different pads, such that the sound emanating from the different active (i.e. non-obstructed) loudspeakers is coherent.

It will furthermore be noted that said display commands comprise at least one or more of the following pieces of information:

the medium or media to be displayed, the reference(s) to the media to be displayed, it being possible for said media to be stored in the memory of one of the pads and/or stored online.
  the spatial display adjustments or shifts to be applied to a medium that is to be displayed or is already displayed. Moreover, during the propagation of display commands from pad to pad, the display adjustments can be combined in order to allow for the correct display of the selected medium.
  the location and/or the identifier of one or more movable elements 14 comprising a tag 16 on the touch-sensitive surface 12 of one of said pads 1.

The dimensions of the screen of said pad and/or adjacent pads, optionally that each of the pads indicates the longitudinal and/or transverse dimensions of the screen thereof, in order to correctly apply said spatial adjustments to the desired medium. It will furthermore be noted that the spatial adjustment or shift to be applied, transmitted in the display commands, may be different depending on said connector via which the information is propagated. Indeed, it is sufficient to transmit the spatial adjustment with respect to the spatial position of the electrical connector (i.e. a connector arranged on a longitudinal end may transmit, in its display commands, only the adjustment with respect to the length of the screen of the pad). The spatial adjustment that is propagated can thus be dependent only on one of the dimensions of the touchscreen of the pad.

It is also advantageous for the list of active connectors (which have thus propagated a command) to be reinitialized when a new medium is selected via said selection means.

Moreover, periodically, the pad is configured to verify the state of the connectors (presence or absence of a connection) and to remove each of the connectors, from the list of active connectors, if said connector is inactive. The pad according to the invention can also remove an inactive connector from the list of connectors that have propagated a command, which makes it possible for the pad to subsequently propagate a command if the connector became active again (reconnection of the connector).

In another variant which is not shown, one or more pads electrically supply the adjacent pads connected thereto, the electrical supply of said adjacent pads being achieved for example via connectors 5 which are described above. Thus, said electrical supply can propagate from pad to pad, via said connectors (in order to recharge one or more pad batteries).

A pad is configured for example so as to be plugged into the mains and to distribute the electricity required for the other connected pads directly or indirectly to said pads.

Figure 6:
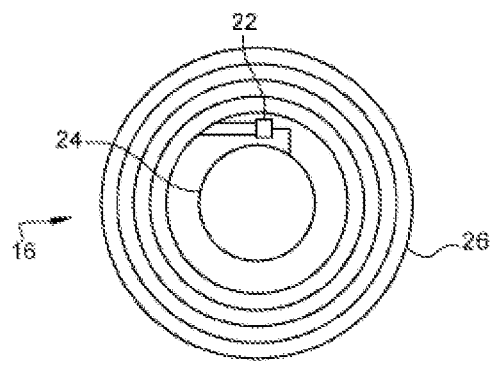
FIGS. 6, 7 and 8 are highly schematic plan views of different embodiments of the tag of FIG. 3.
Figure 7:
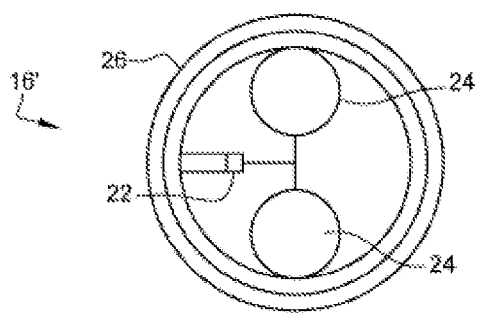
Figure 8:
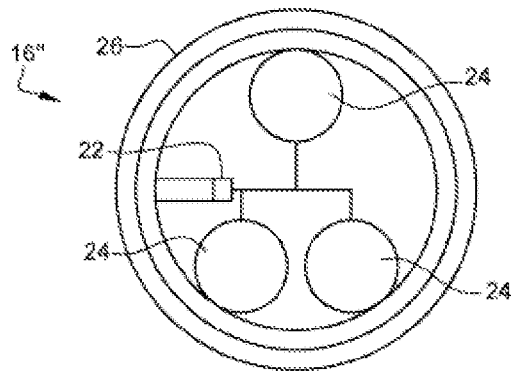

In variants shown in FIG. 6 to 8, the tags 16, 16' or 16" according to the invention may comprise one or more conductive surfaces 24 (said conductive surfaces 24 being connected to the collector of the transistor 28).

In another variant which is not shown, said tag, whatever the embodiment, comprises one or more additional conductive surfaces which are directly connected to the ground of the tag, for example in the region of a node located between the transmitter and said ground. The additional conductive surface(s), for example in the shape of a disk, are arranged in the vicinity of said conductive surface(s) connected to the transistor of the tag.

The additional conductive surface and the conductive surface controlled by the transistor are thus configured (i.e. arranged in an appropriate manner) for a capacitive effect to be created between said (initial and additional) conductive surfaces. Thus, an electrical field is established between said conductive surfaces when the transistor of the tag is a pass transistor. Said additional surface thus makes it possible to generate a more significant touch, thus allowing for improved detection of a movable element by the touch-sensitive surface of said pad.

More particularly, when the tag 16 comprises a plurality of conductive surfaces 24, at least two, it is possible to detect the rotation of an element 14 via the touch-sensitive surface 12, and thus the orientation thereof. Moreover, when the tag 16 comprises at least three conductive surfaces 24 arranged asymmetrically, it is possible to detect the rotation of said element 14, the orientation thereof, and the direction thereof (indeed, it is possible to define a reference point and to determine the direction of said element with respect to said reference point). In this variant, it is the electronic circuit 7 which is configured to determine the rotation and/or the orientation (as well as the direction) of the elements 14 comprising the appropriate number of conductive surfaces 24.

The game board according to the invention thus makes it possible to know, in real time, the number of tags present, using a near field communication technology, in contact with a touch-sensitive surface, the identifier of these tags, as well as the position thereof on said touch-sensitive surface.

It will also be noted that the communications module 22 of the tag 16, 16' or 16" may be an electronic chip of the near field communication type which is connected both to an antenna 26 and to one or more conductive surfaces 24. The chip and the elements 22 and 24 may be mounted on a substrate, which is for example insulating; said assembly is also referred to by the term "tag inlay."

The invention also relates to a tag of the near field communication type, which comprises at least one antenna 26, a conductive surface 24, and a chip 22 that is connected to the antenna 26 and to said conductive surface 24.

Said chip 22 is configured to send a signal to the conductive surface if the antenna 26 receives the appropriate electromagnetic field.

Said signal transmitted by the chip 22 may be for example a grounding of the conductive surface 24, as has been described above, or drawing of current or voltage.

It will be noted that the antenna 26 of the tag is configured to receive an appropriate electromagnetic field (for example of the near field communication type) or a signal containing a command which will be transmitted to the chip 22, said chip 22 being capable of interpreting the received signal and of triggering operations as a result. In particular, the operation of changing the electrical state of the conductive surface 24, either connecting the conductive surface 24 to an electrical ground, or by sending an electrical signal to said surface.

In a variant that is not shown, said conductive surface (or said contact point) is a connector, for example electrical, such as a POGO connector.

In another variant that is not shown, the game board according to the invention (and more particularly the pads which make it up) may be configured to sequence the activation of the tags so as to sequentially retrieve the coordinates of the conductive zones on the touch-sensitive surface, in order to allow for the identification and locating of the various tags on a touch-sensitive surface (it will be noted that this application can be performed on a surface that is not touch-sensitive, but is electrically conductive).

In embodiments which are not shown, said pads 1 of the game board furthermore comprise one or more of the following elements;
- mechanical and/or magnetic nesting means in order to allow for other pads to nest in the region of the transverse sides thereof.
- an accelerometer which is configured for example to influence the display command(s) sent and/or received.
- one or more additional communication means (or modules) configured to communicate wirelessly with another pad and/or a computer.

The nesting means comprise for example magnetic elements having a positive polarity and a negative polarity, making it possible to optimize the connection among the various connectors, to serve as a foolproof device when assembling a plurality of pads according to the invention and/or to promote the correct positioning of the screens of the different pads, in order to form a game board that is as regular as possible.

It will also be noted that said nesting means may be substantially magnetic or mechanical, or indeed may be a combination of the two.

It will be noted that when a game board comprises an accelerometer, this makes it possible in particular to detect the movement of a pad when this communicates and displays an image in association with other touch pads, and thus to dynamically change the display of the moved pad, but also of other pads. For example, as soon as the accelerometer of a pad detects a movement that exceeds a predetermined threshold, said screen of the pad is deactivated.

It can be noted that, when a pad comprises an accelerometer, the status of the reference pad may be associated with said accelerometer, for example the pad may be configured to lose its status of reference pad when this is moved.

What is claimed:

1. A Modular interactive digital game board, said board comprising:
   one or more touch pads and one or more movable elements comprising at least one near field communication (NFC) tag;
      wherein said at least one tag being configured such that an identifier is transmitted in the presence of an electromagnetic field; and
      wherein each of said touch pads comprise a touchscreen which comprises a touch-sensitive surface which is configured to detect a position of at least one movable element comprising at least one conductive surface in a changed electrical state when said element is in contact with said touch-sensitive surface;
   a means for detecting other touch pads comprising a plurality of physical connectors disposed on transverse sides of said touch pad;
   a communication means for communicating with at least one other touch pad detected by said detection means comprises the plurality of physical connectors
   a transmitter of the near field communication type which generates at least one electromagnetic field;

a receiver which receives an identifier transmitted by said at least one tag; and an electronic circuit connected to the detection means, to the transmitter, to the touch-sensitive surface and to said receiver, said circuit being configured to associate a position information provided by the touch-sensitive surface with the identifier received by said receiver;

wherein said electronic circuit is configured to:
transmit display commands to the touch pads detected;
receive the display commands via said communication means; and
associate the position information provided by the touch-sensitive surface with the identifier received by said receiver.

2. The Board according to claim 1, wherein the transmission of the electromagnetic field is triggered by the detection of a touch by one of the touch-sensitive surfaces of said touch pads.

3. The Board according to claim 1, wherein the conductive surface of said tag is configured such that an electrical state thereof is changed in the presence of a first electromagnetic field, while the transmission of the identifier is triggered by a second electromagnetic field, said electromagnetic fields being transmitted by said transmitter.

4. The Board according to claim 1, wherein said conductive surface of said tag is configured to be in a permanent changed electrical state, said changed electrical state allowing the touch-sensitive surface to detect the position of said one movable element.

5. The Board according to claim 1, wherein said display commands comprise one or more of the following pieces of information:
at least one medium to be displayed, or a reference to a medium to be displayed;
at least one spatial display adjustment or shift to be applied to a medium; and
the location and/or identifier of one or more movable elements comprising at least one tag arranged on the touch-sensitive surface of one of said touch pads.

6. The Board according to claim 1, wherein a medium or media displayed by the touchscreens of said touch pads is/are dependent on the position of one or more movable elements on at least one of said touch pads.

7. The Board according to claim 1, wherein said plurality of connectors comprise pogo connectors connected to a draw resistor and the draw resistor connected to a ground.

8. The Board according to claim 7, wherein a separate detector is positioned on multiple sides of said touch pads; and wherein a first touch pad and a second touch pad are interconnected via the connectors.

9. The Board according to claim 1, wherein each of said touch pads comprises one or more loudspeakers, each of said touch pads being configured to perform at least one or more of the following actions:
deactivating the loudspeakers located on the sides close to or in contact with another pad; and
changing the sound depending on the location of one or more movable elements on the touch-sensitive surface of one of said touch pads.

10. The Board according to claim 1, wherein each of the touch pads comprises a memory configured to store one or more of the following items of information:
the list of the active communication means;
the presence of a command for displaying a medium;
the communication means having propagated display commands;
at least one medium; and
the location and/or identifier of one or more movable elements comprising at least one tag on the touch-sensitive surface of one of said touch pads.

11. The Board according to claim 1, wherein one or more touch pads electrically supply, via said communication means, the adjacent pads connected thereto.

12. The Board according to claim 1, wherein said at least one movable element comprises at least two conductive surfaces per tag.

13. The Board according to claim 1, wherein said at least one movable element comprises at least three conductive surfaces per tag, said conductive surfaces being arranged asymmetrically.

14. The Board according to claim 1, wherein the tag has a conductive surface; wherein a the electromagnetic field modifies an electrical state of a tag's conductive surface; and wherein a another electromagnetic field, distinct from the electromagnetic field, triggers a transmission of an identifier by the tag.

15. The Board according to claim 1, wherein each of said touch pads further comprise an accelerometer, wherein the accelerometer detects a movement of a respective touch pad and causes a change in the display of at least one other touch pad.

16. The Board according to claim 1, wherein the tag comprises an antenna and a plurality of conductive surfaces comprising metal, and wherein when a moveable element comprising the tag is positioned on the touch-sensitive surface of the touch pad, the electromagnetic field generated by the transmitter causes the conductive surface of the tag to be grounded.

17. The Board according to claim 16, wherein the tag comprises a communication module comprising a switch, the communication module being coupled to the antenna and the plurality of conductive surfaces and a ground, wherein the switch connects the conductive surface of the tag to the ground when the antenna receives an electromagnetic field.

18. The Board of claim 17, wherein the switch comprises a transistor, and the tag further comprises a diode, and a capacitor, wherein the transistor is coupled to the ground, is coupled to the plurality of conductive surfaces, is coupled to the diode and is coupled to the capacitor.

19. The Board according to claim 16, wherein the antenna surrounds the plurality of conductive surfaces.

* * * * *